(12) United States Patent
Henwood

(10) Patent No.: US 9,999,992 B2
(45) Date of Patent: Jun. 19, 2018

(54) PLASTIC BODIES AND METHODS OF FORMING PLASTIC BODIES

(71) Applicant: Rotomotive Ltd, Northampton, Northamptonshire (GB)

(72) Inventor: Nicholas Henwood, Northampton (GB)

(73) Assignee: Rotomotive Ltd, Northampton (GB)

( * ) Notice: Subject to any disclaimer, the term of this patent is extended or adjusted under 35 U.S.C. 154(b) by 367 days.

(21) Appl. No.: 14/907,467

(22) PCT Filed: Jul. 21, 2014

(86) PCT No.: PCT/GB2014/052220
§ 371 (c)(1),
(2) Date: Jan. 25, 2016

(87) PCT Pub. No.: WO2015/015164
PCT Pub. Date: Feb. 5, 2015

(65) Prior Publication Data
US 2016/0176076 A1    Jun. 23, 2016

(30) Foreign Application Priority Data

Jul. 30, 2013    (GB) .................................. 1313549.6

(51) Int. Cl.
*B29C 41/06*    (2006.01)
*B29C 41/00*    (2006.01)
(Continued)

(52) U.S. Cl.
CPC ............ *B29C 41/06* (2013.01); *B29C 41/003* (2013.01); *B29C 41/22* (2013.01); *B29C 41/46* (2013.01);
(Continued)

(58) Field of Classification Search
CPC ....... B29C 41/06; B29C 41/003; B29C 41/22; B29C 44/5681; B29C 41/46; B29C 44/02; B29K 2023/00; B29K 2075/00; B29K 2105/04; B29K 2023/06; B29K 2023/12; B29K 2105/16; B29K 2995/0037; B32B 1/02; B32B 5/18; B32B 27/065;
(Continued)

(56) References Cited

U.S. PATENT DOCUMENTS

| 3,976,821 A | 8/1976 | Carrow et al. |
| 4,519,964 A | 5/1985 | Rosen |
| 4,612,249 A | 9/1986 | Packer et al. |

FOREIGN PATENT DOCUMENTS

| EP | 0047038 | 3/1982 |
| EP | 0698464 | 2/1996 |

(Continued)

OTHER PUBLICATIONS

International Search Report and Written Option for PCT/GB2014/052220 (dated Oct. 22, 2014).
(Continued)

*Primary Examiner* — Michael C Miggins
(74) *Attorney, Agent, or Firm* — Klarquist Sparkman, LLP

(57) ABSTRACT

A film of plastic material for wrapping, obtained by cast co-extrusion in three layers, wherein an inner layer consists of elastomer-based propylene, containing ethylene, and metallocene polyethylene, while a central layer and an outer layer consist of metallocene polyethylene with different melt flow indexes, that of the metallocene polyethylene of the central layer being the lower one.

36 Claims, 1 Drawing Sheet

(51) Int. Cl.
    *B29C 41/22*     (2006.01)
    *B29C 44/56*     (2006.01)
    *B29C 41/46*     (2006.01)
    *B29C 44/02*     (2006.01)
    *B32B 1/02*     (2006.01)
    *B32B 5/18*     (2006.01)
    *B32B 27/06*     (2006.01)
    *B32B 27/20*     (2006.01)
    *B32B 27/32*     (2006.01)
    *B29K 23/00*     (2006.01)
    *B29K 75/00*     (2006.01)
    *B29K 105/04*     (2006.01)
    *B29K 105/16*     (2006.01)

(52) U.S. Cl.
    CPC .......... *B29C 44/02* (2013.01); *B29C 44/5681* (2013.01); *B32B 1/02* (2013.01); *B32B 5/18* (2013.01); *B32B 27/065* (2013.01); *B32B 27/20* (2013.01); *B32B 27/32* (2013.01); *B29K 2023/00* (2013.01); *B29K 2023/06* (2013.01); *B29K 2023/12* (2013.01); *B29K 2075/00* (2013.01); *B29K 2105/04* (2013.01); *B29K 2105/16* (2013.01); *B29K 2995/0037* (2013.01); *B32B 2250/03* (2013.01); *B32B 2250/24* (2013.01); *B32B 2439/00* (2013.01)

(58) Field of Classification Search
    CPC ..... B32B 27/20; B32B 27/32; B32B 2250/03; B32B 2250/24; B32B 2439/00
    See application file for complete search history.

(56) References Cited

FOREIGN PATENT DOCUMENTS

| | | |
|---|---|---|
| JP | 2002283521 | 10/2002 |
| WO | WO03/045657 | 6/2003 |
| WO | WO2005/090175 | 9/2005 |

OTHER PUBLICATIONS

Search Report for GB1313549.6 Under Section 17(5) (dated Jan. 22, 2014).

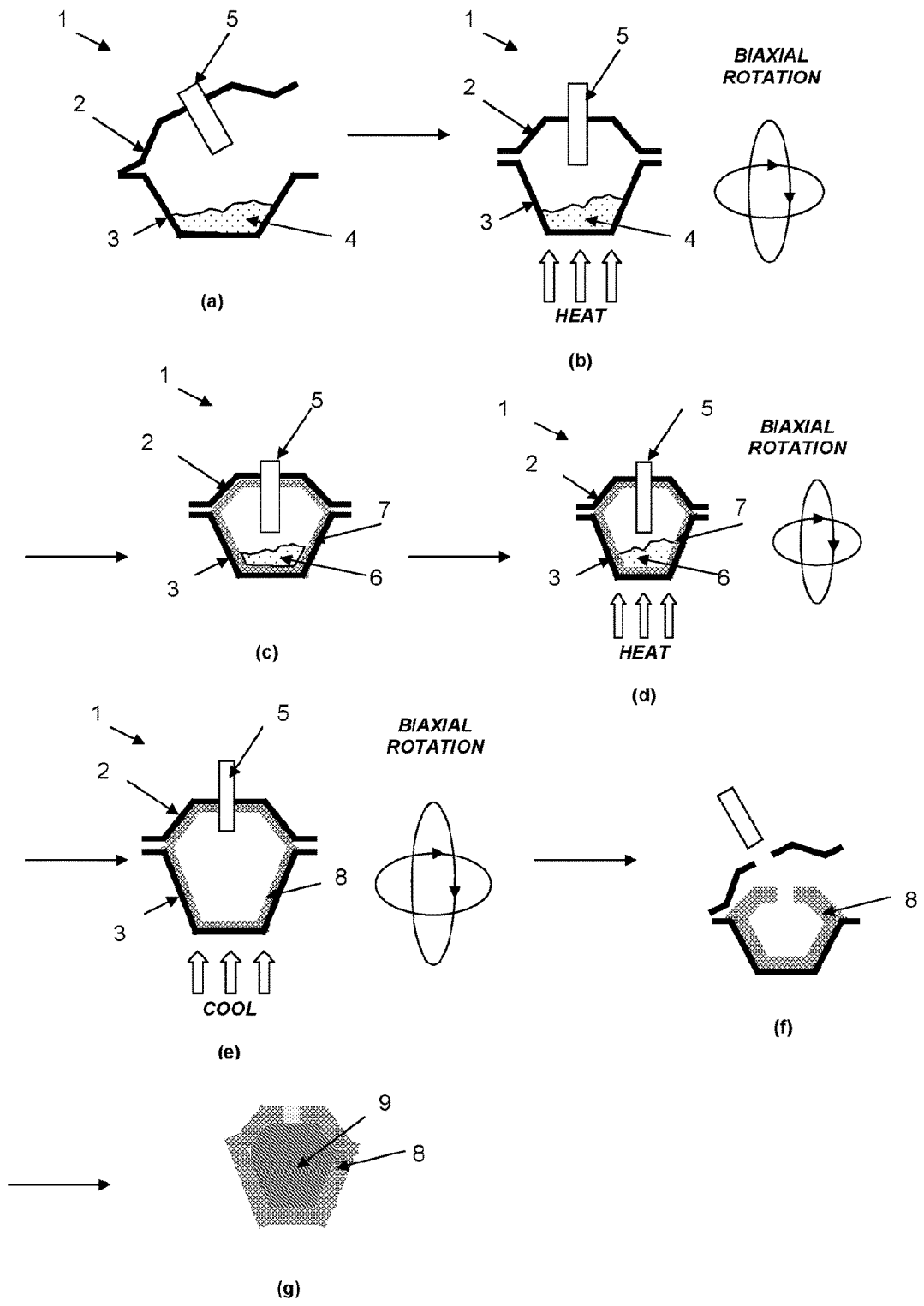

PLASTIC BODIES AND METHODS OF FORMING PLASTIC BODIES

CROSS REFERENCE TO RELATED APPLICATIONS

This is the U.S. National Stage of International Application No. PCT/IGB2014/052220, filed Jul. 21, 2014, which was published in English under PCT Article 21(2), which in turn claims the benefit of Great Britain Patent Application No. 1313549,6 filed Jul. 30, 2013, both of which are incorporated herein in their entireties.

This invention relates to plastic bodies. This invention also relates to methods of forming plastic bodies.

Plastic bodies are formed for a plurality of purposes. One way of forming plastic bodies is rotational moulding (sometimes referred to as rotomoulding).

Rotational moulding is a plastic forming process often used to make hollow plastic parts or bodies. Rotomoulding is used to form many different plastic bodies of different shapes and sizes, including, but not limited to, tanks (for example water storage tanks), boat hulls, canoes, kayaks, flotation devices, buoys, materials handling containers and many types of technical parts.

In a standard rotomoulding process, solid plastic powder (for example, Revolve™ N-250, as sold by Matrix Polymers™ which is a general purpose linear medium density polyethylene powder (MFI 7 g/10 min, density 0.935 g/cm$^3$)) is charged into a metal mould. The metal mould is shaped complementarily to the desired shape of the plastic body. The charged mould is rotated simultaneously, preferably in two directions (sometimes referred to as biaxial rotation), whilst being subjected to heating, for example in an oven. Pressure is not usually applied during the process and a vent pipe through the metal mould ensures that the pressure inside and outside the mould is maintained in equilibrium (i.e. at atmospheric pressure). There are techniques occasionally used, where the mould is pressurised very slightly (to approximately 0.2 bar), as a way of accelerating the sintering stage during cooking.

This biaxial rotation ensures that the plastic powder is moved slowly over all of the internal surfaces of the mould. As the metal mould heats up, powder particles become tacky and the plastic starts to adhere to the inside surface of the mould. After a period of time (typically greater than 15 minutes, but dependent on the physical properties of the plastic), substantially all of the powder adheres to the mould surface. After further heating, for a time sufficient to melt the plastic particles, the plastic particles melt and fuse to each other.

After substantially all of the plastic particles have melted and are fused together, the heat source is removed from the still rotating mould. The mould is often cooled, typically by blowing air across it. A water spray is sometimes applied to the external surface of the mould to accelerate the cooling process. As the plastic cools towards its crystallization point, it solidifies. Typically for the most common plastic used in rotomoulding (that is, polyethylene), this occurs around 125° C. For most other plastics used in rotomoulding, this occurs at a higher temperature, for example 140° C. for polypropylene and 190° C. for polyamide 12. After a further period of cooling, the mould is opened and the moulded plastic body is removed.

The process can be repeated to make a series of generally identical hollow plastic parts or bodies.

In some applications, the hollow plastic body consists of a double-walled shape, where the cavity between walls forms a substantially hollow inside. In such cases, a polymer foam, for example a polyurethane formulation, is sometimes injected into the cavity after the plastic body is removed from the mould; the polyurethane formulation reacts to form polyurethane foam that substantially fills the hollow cavity. Plastic bodies are often filled with a plastic foam when it is desired for the plastic body to provide heat insulation and/or buoyancy.

Rotomoulding is unusual among other plastics forming methods in that it is almost completely dependent on one family of plastic materials/polymers; namely, polyolefins, preferably polyethylene or polypropylene, and most preferably polyethylene. Most other types of polymer, many of which are commonly used in other plastic forming processes, are not suitable for rotomoulding. There are some examples of rotational moulding using polyamide (for example Rilsan™ as sold by Arkema™) or PVC (polyvinyl chloride).

Polyolefins, once reacted to form a polymer (for example polyethylene), are inherently resistant to chemical attack and this makes it difficult to adhere any other substrate to them.

The combination of a polyolefin skin surrounding a polyurethane foam core suffers from the severe disadvantage that there is little or no bonding between the skin and foam core and, after a short period (for example 5 to 10 minutes), the polyurethane foam and the polyethylene skin de-laminate. This results in the skin/foam system ceasing to function as an integrated structure, with a loss of properties of the plastic body and poor aesthetics.

U.S. Pat. No. 4,612,249 discloses a previous method of forming a bond between polyurethanes and polyolefins. This method involves coating a polyolefin with a graft copolymer of a polyolefin and a functional monomer such as acrylic acid. The graft copolymer was flame treated and then a polyurethane composition was applied and cured. This method is not applicable to plastic bodies formed by rotomoulding because flame treatment of the internal surface of a rotomoulded body would, at least, damage the integrity of the polyolefin layer of the body and would be extremely difficult to carry out for most rotomoulded items.

The present invention seeks to address the problems identified above.

According to a first aspect of the present invention, there is provided a plastic body, comprising:
  a first layer comprising a rotomouldable plastic;
  a second layer, within the first layer, comprising a rotomouldable plastic,
  a coupling agent and a filler; and,
  a core comprising a plastic foam;
  wherein the coupling agent acts to form a bond between the rotomouldable plastic, the filler and the plastic foam.

Preferably, wherein the rotomouldable plastic comprises or consists of a polyolefin.

Further preferably, wherein the rotomouldable plastic is polyethylene or polypropylene.

Advantageously, wherein the rotomouldable plastic of the first layer and the second layer are the same rotomouldable plastic.

Preferably, wherein the coupling agent is a chemical agent which increases the reactivity of the rotomouldable plastic.

Further preferably, wherein the coupling agent is maleic anhydride, acrylic acid, or vinyl acetate.

Advantageously, wherein the filler is an inorganic granular material.

Preferably, wherein the inorganic granular material is sand, ground rock, ground garnet, diatomaceous earth, cenospheres, glass or carbon fibres.

Further preferably, wherein the filler is an organic granular material.

Advantageously, wherein the organic granular material is wood flour or vegetable fibres.

Preferably, wherein the filler has an average particle size of from 100 microns, to any one of 150, 200, 250, 300, 350, 400, 450, 500, 550, 600, 650, 700, 750, 800, 850, 900, 950, 1000, 1050 or 1100 microns, optionally from 250 microns to 500 microns.

Further preferably, wherein the plastic foam is a polyurethane.

Advantageously, wherein the polyurethane is epoxy-based syntactic foam.

Preferably, wherein the first layer, the second layer and/or the core comprise one or more additives.

Further preferably, wherein the one or more additives are selected from one or more of: a heat stabiliser, a light stabiliser, a UV absorber, a colourant, a flame retardant, an anti-bacterial additive and/or any combination of each of these additives.

Advantageously, wherein the second layer further comprises a chemical blowing agent.

Preferably, wherein the chemical blowing agent is azodicarbidimide, oxybis benzenesulphonyl hydrazide, sodium bicarbonate, or blends of any two or all three of these.

Further preferably, wherein the plastic body, comprises or consists of:
  a first layer comprising at least 80% by weight rotomouldable plastic;
  a second layer, within the first layer, comprising at least 80% by weight
  a rotomouldable plastic, a coupling agent and a filler; and,
  a core comprising at least 80% by weight a plastic foam;
  wherein the coupling agent acts to form a bond between the rotomouldable plastic, the filler and the plastic foam.

Advantageously, wherein the plastic body is a tank, a water storage tank, a boat hull, a canoes, a kayak, a flotation device, a buoys, a materials handling container, or any part shaped for a technical purpose.

According to a further aspect of the present invention, there is provided a method of forming a plastic body, the method comprising:
  forming a layer comprising a rotomouldable plastic, a coupling agent and a filler between: a layer comprising a rotomouldable plastic; and, a core comprising a plastic foam.

Preferably, wherein the plastic body comprises: a first layer comprising a rotomouldable plastic; a second layer, within the first layer, comprising a rotomouldable plastic, a coupling agent and a filler; and, a core comprising a plastic foam; wherein the coupling agent acts to form a bond between the rotomouldable plastic, the filler and the plastic foam.

Further preferably, wherein the method further comprises the step of:
  rotomoulding a first layer comprising a rotomouldable plastic; and,
  rotomoulding a second layer, within the first layer, the second layer comprising a rotomouldable plastic, a coupling agent and a filler;
  wherein the coupling agent may act to form a bond between the rotomouldable plastic, the filler and a plastic foam.

Advantageously, wherein the method further comprises the step of:
  introducing a core comprising a plastic foam within the first layer and the second layer.

Preferably, wherein rotomoulding includes biaxially rotating a mould containing the components of the first layer and/or the second layer of rotomouldable plastic and applying heat.

Further preferably, wherein the heat applied is from 100° C. to 300° C.; optionally, from 150° C. to 250° C.

Advantageously, wherein the rotomouldable plastic is a polyolefin.

Preferably, wherein the polyolefin is polyethylene or polypropylene.

Further preferably, wherein the plastic foam is a polyurethane.

Advantageously, wherein the coupling agent is maleic anhydride, acrylic acid, or vinyl acetate.

Preferably, wherein the filler is an inorganic granular material or an organic granular material.

Further preferably, wherein the method further comprises the step of:
  introducing one or more additives into the first layer, the second layer and/or the core.

Advantageously, wherein the additives are selected from one or more of: a heat stabiliser, a light stabiliser, a UV absorber, a colourant, a flame retardant, an anti-bacterial additive and/or any combination of each of these additives.

Preferably, wherein the method is a one-shot or a two-shot method.

Further preferably, wherein the method is a one-shot method and the one-shot method includes the step of: introducing the rotomouldable plastic, the coupling agent and the filler into a mould in the same step.

Advantageously, wherein the method is a two-shot method and the two-shot method includes the steps of: introducing one or two of the rotomouldable plastic, the coupling agent and the filler into a mould in a step separate from introducing the other one or two of the rotomouldable plastic, the coupling agent and the filler.

According to a further aspect of the present invention, there is provided a plastic body obtainable by the method according to the above.

Specific and non-limiting embodiments of the invention, in all its aspects, will now be described, strictly by way of example only.

An embodiment of the invention is described below with reference to the accompanying drawing, in which:

FIG. 1 is a schematic representation of a method of forming a plastic body.

With reference to FIG. 1, a portion of a rotomoulding apparatus 1 is shown. The rotomoulding apparatus includes a mould comprising a top portion 2 and a bottom portion 3. The mould may comprise additional portions. A vent 5 may be placed through the top portion 2 of the mould.

Additional components of the rotomoulding apparatus are not shown but are known in the art. A specific example of a rotomoulding apparatus with a gas oven (the most common configuration for industrial rotomoulding) is a Rotoline™ DC 5.00XT shuttle rotomoulding machine. Many other rotomoulding apparatuses are known.

A first rotomouldable polymer starting material 4 is placed into the lower portion of mould 3 in step (a). The first rotomouldable polymer starting material 4 comprises granular polymer starting materials (for example polyethylene roto grade plastic powder, a particular example being Revolve™ N-250, as sold by Matrix Polymers™) and optionally includes additives. The first rotomouldable polymer starting material may comprise polyethylene, polypropylene, nylon or PVC. A preferred polymer starting material 4 comprises a polyolefin, for example polyethylene or polypropylene. Additives which may be included in the first rotomouldable starting material include: heat and/or light stabilisers, colourants, flame retardants and/or anti-bacterial additives, and/or mixtures of these additives.

Examples of additives included in the rotomouldable material include, in non-limiting examples:
  Primary heat stabilisers: hydrogen-donating antioxidants, which act as free-radical scavengers, such as hindered phenols and secondary aromatic amines.
  Secondary heat stabilisers: hydroperoxide decomposers, such as organophosphorous compounds.
  UV absorbers: such as benzotriazoles.
  Light stabilisers: such as hindered amine light stabilisers (HALS), which act as radical scavengers.
  Flame retardants: such as brominated compounds and antimony trioxide.
  Anti-bacterials: such as triclosan or silver iodide compounds.

In step (b) of the method shown in FIG. 1, the top portion 2 and a bottom portion 3 of the mould are closed together, so that the mould is closed. The mould is both heated and subjected to biaxial rotation. In one non-limiting example, the oven is maintained at a temperature of 250-350° C.; the pressure is maintained at atmospheric pressure by the action of a vent. This step spreads a layer of the first rotomouldable polymer starting material 4 around the mould.

As shown in step (c), after a sufficient time, a first layer of polymer 7 forms within the mould and a second rotomouldable polymer starting material 6 is introduced into the mould, optionally through a vent 5. The mould is then closed.

As shown in step (d), the mould is both heated and subjected to biaxial rotation for a second time. This spreads a layer of the second rotomouldable polymer starting material 6 around the mould, on top of the first layer of polymer 7.

As shown in step (e), after a sufficient time, a layer of polymer 8 forms in the mould. Polymer layer 8 may be described as a bilayer of polymer. The first (outer) layer of the bilayer is formed of the first layer of polymer 7, formed in step (c). On top (on the inner surface) of the first layer of polymer 7 is formed a second layer of polymer. There is bonding between the first layer of polymer 7 and the second layer of polymer. The mould is cooled in step (e). The mould is opened in step (f), to permit the layer of polymer 8 to be extracted from the mould.

As shown in step (g), starting materials for forming a polymer foam are introduced into the hollow portion of the layer of polymer 8, preferably whilst the layer of polymer 8 is still above room temperature to assist in the reaction of the starting materials for forming a polymer foam. The resulting product shown in step (g) is a plastic body having a layer of rotomouldable polymer 8 surrounding a polymer foam 9.

The material of the second layer 6 (formed in step (d) above) is selected so that it bonds both to the polyolefin outer layer (7) and to the foam core (9). In this way, a cohesive (non-de-laminating) integrated structure is created.

The material of the second layer 6 is polyolefin based if the outer layer 7 is polyolefin based, which means that it will bond completely to the first layer 7, which is also polyolefin based. If the first layer is polyethylene (plus optional additives, as listed above), the second layer is preferably also polyethylene-based. If the first layer is polypropylene (plus optional additives, as listed above), the second layer is preferably also polypropylene-based.

The material of the second (inner) layer 6 incorporates: polymer, a coupling agent and a filler. The coupling agent acts to form a bond between the polymer and the filler. The presence of the filler at the inside surface of the second layer provides a surface for the formation of bonds between the second layer and the later introduced foam (9) (preferably a polyurethane foam). Without wishing to be bound by theory, the nature of the bond is two-fold: firstly, there is a chemical bond between the inorganic filler and the polyurethane; secondly, if the filler particles are sufficiently coarse, there is a mechanical bond created by polyurethane foam becoming entrapped in the microscopic irregularities of the surface layer of the second layer.

Polyolefin-coupling agent systems for the second layer can be selected from the following, non-limiting, list:
  Maleated polyethylene (mah-PE)
  Maleated polypropylene (mah-PP)
  Ethylene acrylic acid (EAA) copolymers of polyethylene
  Ethylene vinyl acetate (EVA) copolymers of polyethylene One criterion for the choice of polymers in each layer is the compatibility of the second layer 6 material with the rotomouldable material (which is preferably a polyolefin) used for the first (outer) layer 7.

The method of forming a plastic body described above, with reference to FIG. 1, wherein the second rotomouldable polymer starting material 6 is inserted into the mould, on top of the first layer of polymer 7, can be described as a two-shot moulding method. Two-shot moulding methods are used widely in the production of rotomoulded plastic bodies. The two-shot method is, in some situations, interrupted to permit removal of the mould from the oven and the introduction of the second rotomouldable polymer starting material 6.

In an alternative method, a one-shot method is utilised. In a one-shot method, the first rotomouldable polymer starting material 4 and the second rotomouldable polymer material 6 are both placed into the lower portion of mould 3 in step (a). In step (b), similarly to the method described with reference to FIG. 1, the top portion and the lower portion of the mould are closed together, so that the mould is closed. The mould is both heated and subjected to biaxial rotation. In one non-limiting example, the oven is maintained at a temperature of 250-350° C.; the pressure is maintained at atmospheric pressure by the action of a vent. This step spreads the first rotomouldable polymer starting material 4 and the second rotomouldable polymer 6 around the mould. In this one-shot method, steps (c) and (d) of FIG. 1 do not occur; after step (b), the method proceeds to step (e) and continues to steps (f) and (g), as described above with reference to the two-shot method.

One-shot rotomoulding methods can produce plastic bodies according to the present invention. In order to produce the first layer and the second layer of the plastic bodies of the present invention in a one-shot method, the rotation of the mould in step (b) generally segregates different particles to form different layers of components.

Non-limiting examples of one-shot methods that can be employed include the following:
  Packing the material for the second rotomouldable polymer starting material 6 in a flexible bag (or a number of flexible bags) made of a fuseable material, for example a plastic material. The bag is inserted into the mould in step (a), at the same time as the first rotomouldable material 4 is placed into the lower portion of mould 3. During the rotation and heating step (b), the bag melts, ruptures and its contents spill into the mould, ultimately forming the second layer of polymer. The bag can be composed of a material that is selected so that the temperature at which bag rupture takes place after the layer of the first rotomouldable polymer starting material 4 is formed. The bag can be formed of a material with a melting point higher than the first rotomouldable material 4; for example, a bag made from polypropylene film melts at a higher temperature (and therefore at a later time in the method) than a first rotomouldable polymer starting material 4 of polyethylene. Similarly, a bag of thicker material will take longer to rupture than a thin-walled bag.

Delivering the second rotomouldable polymer starting material 6 into the mould from a drop box, once the first layer of material 7 has been laid down. A drop box is an insulated hopper attached to the outside of the mould and connected to it by a pipe (not shown). At the start of the method, the pipe is closed by a closure means, for example a moveable bung, so that material held in the hopper cannot pass between the mould and the drop box. During the heating and biaxial rotation step (b), once the layer of first rotomouldable polymer starting material 4 has been laid down, the pipe closure means is removed and the contents of the drop box can flow into the mould. Typically, the opening of the pipe closure means (for example a movable bung) is initiated by air pressure applied to a pneumatic cylinder, or by a spring loaded clip.

Providing the first rotomouldable polymer starting material 4 and the second rotomouldable polymer starting material 6 in one mixture which separates into the first rotomouldable polymer starting material 4 and the second rotomouldable polymer starting material 6, during the heating and biaxial rotation stages of step (b). For example, if the second rotomouldable polymer starting material 6 is in the form of large pellets (of 2 to 10 mm, optionally 3 to 5 mm, diameter) and the first rotomouldable polymer starting material 4 is at least ten times smaller in diameter that the pellets of the second rotomouldable polymer starting material 6, the different pellets separate into layers by the powder motion within the mould as it rotates.

In a preferred embodiment, the second layer polymeric material 6 is a blend of mah-PE and polyethylene, combined together by melt extrusion. Typically, the mah-PE will contain a relatively low level of maleic anhydride, for example 1% maleic anhydride by weight, the remainder being polyethylene. The commercial product Yparex™ 8104E has been found to be a suitable grade of mah-PE and it has been found that this material is particularly effective in this embodiment if it has been diluted with polyethylene, ideally in the ratio 25%:75% (plus or minus 20%) by weight mah-PE: polyethylene.

The polyethylene used in the second layer 6 will typically be a grade of linear low or linear medium density polyethylene; typical specification range is density 0.920-0.960 g/cm$^3$ (plus or minus 20%) and Melt Flow Index (MFI) 2-20 g/10 min (plus or minus 20%). The density and MFI were chosen to provide compatible properties to the material used in the first layer. Preferably, the material densities of the polyethylenes used in the first and second layers should be similar, for example no greater than 5-10% difference. If the densities diverge too widely, the shrinkage rates of the first and second layers may be different and, in this case, the shrinkage differences may promote some delamination of the layers, especially in the corners of the plastic body.

Before introduction into the mould, the second layer polymeric material is preferably ground to a powder, to make it suitable for rotomoulding. An exemplary specification for the starting materials of the second layer 6 is: maximum particle size 600 micron (plus or minus 20%), average particle size 350 micron (plus or minus 20%), less than 15% (plus or minus 20%) fine particles (<150 micron), more than 5% (plus or minus 20%) fine material (<150 micron), dry flow 25 sec (plus or minus 20%), bulk density 30 g/100 cm$^3$ (plus or minus 20%). However, there can be differences in this example; depending on process conditions, it may even be possible to use small pellets of size>1000 micron for the second layer.

In a preferred embodiment, the filler is optionally an inorganic filler; optionally, finely graded sand. Alternative fillers include ground rock of various types, garnet, diatomaceous earth, cenospheres (a by-product from coal-burning power stations), fly ash and recycled glass. Coarser fillers, with sharp surfaces, are generally more effective in providing a strong mechanical bond than finer fillers. Alternatively, some organic materials may be used as fillers, including wood flour or vegetable fibres. Further alternatively, manufactured fillers such as glass or carbon fibres may be incorporated.

Generally, fillers work best if they are inorganic, with high surface polarity and of relatively coarse size specification. If necessary, their polarity may be further enhanced by treatment with suitable reagents, such as organic silanes.

Levels of filler between 10% and 70% by weight (plus or minus 20%) have been found to be particularly effective. In a preferred embodiment, the ratio of filler to polymer is 50% by weight (plus or minus 20%) filler: 50% by weight (plus or minus 20%) mah-PE/standard PE blend (blend consisting of 25% by weight (plus or minus 20%) mah-PE and 75% by weight (plus or minus 20%) standard PE).

Filler materials may be incorporated into the second layer polymeric material by dry blending rather than by melt extrusion. Most suitable fillers create an abrasive condition that results in excessive wear in the extruder barrel. In addition, it has been found that in a dry blend, the rotation involved in the process can promote a degree of segregation between filler and polymer.

In a further embodiment, a chemical blowing agent is incorporated (by dry blending or by melt extrusion) into the second layer polymeric material. The chemical blowing agent is designed to decompose and liberate gas after the polymer has fully melted, resulting in entrapment of gas bubbles in the polymer melt and the creation of an expanded closed cell foam structure. Chemical blowing agents which can be used for this process include Azodicarbidimide, oxybis benzenesulphonyl hydrazide (often referred to as OBSH), sodium bicarbonate, or blends of all two or all three of these exemplary chemical blowing agents.

One beneficial effect is that, once the second layer material has been loaded into the mould and the second mould rotation commences, there is a tendency for the filler particles to segregate from the polymeric powder particles. Invariably, the filler particles migrate (by a reaction force corresponding to centripetal forces, among others) and concentrate generally towards the inside of the second layer. This is beneficial because the filler particles are most effective at the interface between the second layer and the later introduced polymer foam, preferably polyurethane foam. This segregation effect is magnified if a chemical blowing agent is incorporated into the second layer polymeric material. Segregation and migration of filler particles means that an effective inside layer can be created with less filler being added to the original mix than might otherwise be necessary.

A further beneficial effect of including a filler is that the filler imparts a degree of additional stiffness to the polymer layer (or if chemical blowing agents have been used, to the foam layer). This stiffness increase is more pronounced at high filler loadings (above 25% by weight of filler). At levels above 75% by weight of filler, the polymer layer can lose its preferable polymeric characteristics.

Polymer foam, for example polyurethane foam or epoxy-based reinforced "syntactic" foam (often used in some marine product examples), components are injected into the cavity of the rotomoulded plastic body after it has been removed from the mould, where they react together and create an expanded foam structure. A slight excess of polyurethane components is injected, to ensure that the cavity is completely filled. Optionally, small holes are drilled in the rotomoulded plastic body after removal from the mould, to facilitate the release of trapped air within the cavity and the expulsion of any excess foam. If this is not done, pockets of air may become trapped inside the plastic body, resulting in a lack of foam fill in some areas.

Preferably, the plastic body will be constrained in a fixture during injection of the polyurethane foam components, to prevent the walls of the plastic body from bulging under pressure from the creation of foam within the cavity.

It has been found that polyurethane injection is most advantageously carried out when the rotomoulded plastic body is still warm and above 25° C. (typically at least 40° C. temperature), otherwise any initial warpage of the plastic body may be difficult to rectify.

One particularly preferred, but non-limiting process for forming a plastic body according to the present invention, which may be carried out as shown schematically in FIG. 1, is as set out below:

1. Load the first layer material (for example polyethylene roto grade plastic powder, for example Revolve™ N-250, as sold by Matrix Polymers™) into open mould. Close lid and secure.
2. Rotate mould biaxially and heat simultaneously. The plastic powder starts to melt and lay down on the internal walls of the mould. Continue until all plastic powder has melted and stuck to the walls of the mould. Typically for polyethylene, this is at a mould internal air temperature of approximately 125° C. (plus or minus 20%).
3. Stop rotation, move mould from heat and load the second layer material, through an enlarged vent tube or dedicated fill port. Typically mould internal air temperature will initially drop by approximately 50° C. (plus or minus 20%) because of the cooling effect of second material.
4. Re-start rotation and heating until all of the second layer material has melted and laid down on mould. Typically, this is at a mould internal air temperature of approximately 125° C. (plus or minus 20%).
5. Continue rotation and heating until the target mould internal air temperature is reached. This varies depending on the formulation of the second layer, but is commonly in the range from 160 to 230° C. (plus or minus 20%).
6. Continue rotation but stop heating. Cooling can be in quiescent air, but will typically be accelerated by air flow and/or water spray on the outside of the mould.
7. When mould internal air temperature reaches approximately 90° C. (plus or minus 20%), the rotomoulded plastic body is sufficiently solid to remove from the mould. The optimum demould temperature varies depending on the shape complexity of the plastic body, the mould material and the use of release agent or release coating on the internal mould surface (if used). Release agents are well known. Particular examples of release agents include: permanent PTFE-based coatings (for example Mauscote™); a silicone-based sacrificial release agent (for example as sold by Zyvax™); or, a polysiloxane-based semi-permanent release agent (for example Frekote™ as sold by Loctite™)
8. Open lid of the mould and the remove plastic body. It is sometimes necessary to remove the vent pipe before removal of the plastic body.
9. Move the demoulded plastic body to a cooling fixture, clamp in place and inject a two-part polyurethane composition (polyol and isocyanate). Non-limiting examples of polyols include polyether polyols (for example Lupranol™ as sold by BASF™) or polyester polyols (for example Lupraphen™ as sold by BASF™). Non-limiting examples of isocyanates include diphenylmethane diisocyanate (MDI) or toluene diisocyanate (TDI). The polyurethane components react and a foam structure is created which fills the void inside the rotomoulded part or body. Small air release holes are sometimes formed in the walls of the plastic body, to ensure the absence of pockets of trapped air and consequent void areas in the foam fill. It is preferable to carry out polyurethane foam filling as soon as possible after demoulding of the rotomoulded part or body.
10. Allow the completed body to cool fully, before trimming and storage.

COMPARATIVE EXAMPLE

Controlled tests have shown that the bond between polyurethane foam core and the second skin (inner) polymeric layer, in polymer bodies formed according to the presently claimed invention, is significantly strengthened, compared to the bond between polyurethane foam core and a standard polyolefin skin layer, which is virtually non-existent.

In an industrial demonstration of the invention, the performance of a double walled carrying box was improved by promoting an effective bond between the polyethylene (PE) skin and its foamed polyurethane (PU) core.

The box measured approximately 1200 mm×1000 mm outside dimension and was approximately 700 mm high. The box had pockets moulded into its base for use with a forklift truck or a pallet truck. The box was designed to contain approximately 0.6 m³ of material, which could be either in liquid or solid form.

The box was a double-walled plastic body, where the hollow inside of the body could optionally be filled with foam, for example polyurethane foam.

The box was manufactured by rotomoulding, using a standard linear medium density polyethylene (PE) (in this case, Revolve™ N-250, as sold by Matrix Polymers™) for an outside skin and a two-part polyurethane (PU) foam, in this case polyetherpolyol and MDI injected into the cavity (1 part polyether polyol to 1.4 parts MDI).

30 kg of standard the Revolve™ N-250 polyethylene was charged in a mould and the mould was rotated biaxially in a "clamshell" style gas oven for 18 minutes. There are many "clamshell" style gas ovens in the marketplace. In this case, the oven used was a Ferry™ M-40PC clamshell oven. The set point temperature of the oven was 280° C.

After this time period, the mould was charged with a second shot of material; 14 kg of material was used in this case. The second shot material was formulated as follows:

- 7 kg of an extruder blend of Yparex 8104E (25% by weight) and Revolve 5036 (75% by weight), ground to a "500 micron" powder specification.
- 7 kg of graded sand (Bathgate PSF), which had been dry blended into the PE powder.
- 175 g chemical blowing agent OBSH The second shot material was heated in the oven (same set point temperature as for first shot) for a further 9 minutes, after which the mould (still rotating) was cooled by 30 minutes of fan-assisted air blowing and 5.5 minutes of water spray.

The completed plastic body was removed from the mould and placed in a purpose-designed wooden cooling fixture. It was then injected with 6 kg of a two-part PU blend (1 part polyol (2.5 kg polyether polyol):1.4 parts isocyanate (3.5 kg MDI)). After a short period, PU foam and entrapped air were observed to exit the small release holes which had been drilled in the plastic body before PU filling. This indicated that the foam had been generated and had substantially filled the hollow cavity of the plastic moulding.

After 30 minutes the filled plastic body was released from the fixture, at which point it was at room temperature.

Subsequently, the box was cut into pieces, so that the bond between plastic and PU foam core could be assessed. It was observed that an effective bond existed between the outer and second layers, and between the second and core polyurethane foam layer. This observation was in complete contrast to examination of plastic bodies made where the polyurethane foam was injected into the hollow portion of a polyethylene skin; in this case, the two plastic layers completely delaminated. As a further benefit, the box formed according to the present invention was substantially stiffer than plastic bodies made by the previous method.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A plastic body, comprising:
   a first layer comprising a rotomouldable plastic;
   a second layer, within the first layer, comprising a rotomouldable plastic, a coupling agent and a filler; and,
   a core comprising a plastic foam;
   wherein the coupling agent acts to form a bond between the rotomouldable plastic, the filler and the plastic foam.

2. A plastic body according to claim 1, wherein the rotomouldable plastic comprises or consists of a polyolefin.

3. A plastic body according to claim 1, wherein the rotomouldable plastic is polyethylene or polypropylene.

4. A plastic body according to claim 1, wherein the rotomouldable plastic of the first layer and the second layer are the same rotomouldable plastic.

5. A plastic body according to claim 1, wherein the filler has an average particle size of from 100 microns, to any one of 150, 200, 250, 300, 350, 400, 450, 500, 550, 600, 650, 700, 750, 800, 850, 900, 950, 1000, 1050 or 1100 microns, optionally from 250 microns to 500 microns.

6. A plastic body according to claim 1, wherein the coupling agent is a chemical agent which increases the reactivity of the rotomouldable plastic.

7. A plastic body according to claim 6, wherein the coupling agent is maleic anhydride, acrylic acid, or vinyl acetate.

8. A plastic body according to claim 1, wherein the filler is an inorganic granular material.

9. A plastic body according to claim 8, wherein the inorganic granular material is sand, ground rock, ground garnet, diatomaceous earth, cenospheres, glass or carbon fibres.

10. A plastic body according to claim 1, wherein the filler is an organic granular material.

11. A plastic body according to claim 10, wherein the organic granular material is wood flour or vegetable fibres.

12. A plastic body according to claim 1, wherein the plastic foam is a polyurethane.

13. A plastic body according to claim 12, wherein the polyurethane is epoxy-based syntactic foam.

14. A plastic body according to claim 1, wherein the first layer, the second layer and/or the core comprise one or more additives.

15. A plastic body according to claim 14, wherein the one or more additives are selected from one or more of: a heat stabiliser, a light stabiliser, a UV absorber, a colourant, a flame retardant, an anti-bacterial additive and/or any combination of each of these additives.

16. A plastic body according to claim 1, wherein the second layer further comprises a chemical blowing agent.

17. The plastic body of claim 16, wherein the chemical blowing agent is azodicarbidimide, oxybis benzenesulphonyl hydrazide, sodium bicarbonate, or blends of any two or all three of these.

18. A plastic body comprising;
   a first layer comprising at least 80% by weight rotomouldable plastic;
   a second layer, within the first layer, comprising at least 80% by weight a rotomouldable plastic, a coupling agent and a filler; and,
   a core comprising at least 80% by weight a plastic foam;
   wherein the coupling agent acts to form a bond between the rotomouldable plastic, the filler and the plastic foam.

19. The plastic body of claim 18, wherein the plastic body is a tank, a water storage tank, a boat hull, a canoes, a kayak, a flotation device, a buoys, a materials handling container, or a shaped part shaped for a technical purpose.

20. A method of forming a plastic body, the method comprising:
   forming a layer comprising a rotomouldable plastic, a coupling agent and a filler between: a layer comprising a rotomouldable plastic; and, a core comprising a plastic foam.

21. The method of claim 20, wherein the plastic body comprises:
   a first layer comprising a rotomouldable plastic;
   a second layer, within the first layer, comprising a rotomouldable plastic, a coupling agent and a filler; and,
   a core comprising a plastic foam;
   wherein the coupling agent acts to form a bond between the rotomouldable plastic, the filler and the plastic foam.

22. The method of claim 20, wherein the plastic foam is a polyurethane.

23. The method of claim 20, wherein the coupling agent is maleic anhydride, acrylic acid, or vinyl acetate.

24. The method of claim 20, wherein the filler is an inorganic granular material or an organic granular material.

25. The method according to claim 20, wherein the method further comprises the steps of:
   rotomoulding a first layer comprising a rotomouldable plastic; and,
   rotomoulding a second layer, within the first layer, the second layer comprising a rotomouldable plastic, a coupling agent and a filler;
   wherein the coupling agent may act to form a bond between the rotomouldable plastic, the filler and a plastic foam.

26. The method of claim 25, wherein the method further comprises the step of:
   introducing a core comprising a plastic foam within the first layer and the second layer.

27. The method of claim 25, wherein rotomoulding includes biaxially rotating a mould containing the components of the first layer and/or the second layer of rotomouldable plastic and applying heat.

28. The method of claim 27, wherein the heat applied is from 100° C. to 300° C.; optionally, from 150° C. to 250° C.

29. The method of claim 20, wherein the rotomouldable plastic is a polyolefin.

30. The method of claim 29, wherein the polyolefin is polyethylene or polypropylene.

31. The method of claim 20, wherein the method further comprises the step of:
   introducing one or more additives into the first layer, the second layer and/or the core.

32. The method of claim 31, wherein the additives are selected from one or more of: a heat stabiliser, a light stabiliser, a UV absorber, a colourant, a flame retardant, an anti-bacterial additive and/or any combination of each of these additives.

33. The method of claim 20, wherein the method is a one-shot or a two-shot method.

34. The method of claim 33, wherein the method is a one-shot method and the one-shot method includes the step of: introducing the rotomouldable plastic, the coupling agent and the filler into a mould in the same step.

35. The method of claim 33, wherein the method is a two-shot method and the two-shot method includes the steps of: introducing one or two of the rotomouldable plastic, the coupling agent and the filler into a mould in a step separate from introducing the other one or two of the rotomouldable plastic, the coupling agent and the filler.

36. A plastic body made by the method of claim 20.

* * * * *